United States Patent [19]
Dante

[11] 4,322,321
[45] Mar. 30, 1982

[54] LOW-TEMPERATURE CURABLE SATURATED EPOXY RESIN COMPOSITIONS

[75] Inventor: Mark F. Dante, Houston, Tex.

[73] Assignee: Shell Oil Company, Houston, Tex.

[21] Appl. No.: 227,126

[22] Filed: Jan. 22, 1981

[51] Int. Cl.³ .............................................. C08L 91/00
[52] U.S. Cl. .................................. 523/454; 427/386; 428/416; 428/464; 523/456; 527/312
[58] Field of Search ............... 260/13, 18 PN, 17 R; 427/386; 428/416, 464

[56] References Cited

U.S. PATENT DOCUMENTS 2,450,940  10/1948  Cowan et al. ................. 260/404.5
3,336,241   8/1967  Shokal .............................. 260/2
4,108,824   8/1978  Dante ........................ 260/33.2 EP

*Primary Examiner*—Melvyn I. Marquis
*Attorney, Agent, or Firm*—Norris E. Faringer

[57] ABSTRACT

The present invention provides room temperature curable epoxy coating compositions prepared by reacting (1) a saturated epoxy resin, (2) a curing amount of a polyamide and (3) a cellulose acetate butyrate in the presence of an organic solvent.

9 Claims, No Drawings

LOW-TEMPERATURE CURABLE SATURATED EPOXY RESIN COMPOSITIONS

FIELD OF THE INVENTION

The present invention is directed to the preparation of room temperature curable saturated epoxy resin compositions.

BACKGROUND OF THE INVENTION

It is generally known that epoxy resins such as the diglycidyl ethers of 2,2-bis(4-hydroxyphenyl)propane can be cured with aliphatic and aromatic amines to produce acceptable coatings. It is also known that with the use of aliphatic amines, low-temperature curing systems can be obtained. When, however, saturated epoxy resins are reacted with aliphatic amines, the resulting coatings do not readily cure, i.e., remain wet or tacky for extended periods of time. A process was developed that produced tough, hard film using saturated epoxy resins and aliphatic amines at low baking temperatures. Such low-temperature curable saturated epoxy resin compositions and their methods of preparation are described in U.S. Pat. No. 4,108,824, issued Aug. 22, 1978. While these compositions offer significantly improved low-temperature curing epoxy compositions, there is still a need to improve the pot life and viscosity control. Also, ketone solvents are not operable in these compositions. It is generally known by those skilled in the coatings art that polyamides offer better flexibility, better substrate wetting characteristics, longer pot life and less sensitivity to stoichiometry than the aliphatic amines. It is also known that ketones offer better control of the pot life and viscosity than conventional oxygenated solvents. It would therefore be highly desirable to develop a low-temperature saturated epoxy curing system utilizing polyamides and ketone solvents.

SUMMARY OF THE INVENTION

The present invention provides curable epoxy coating compositions prepared by reacting (1) a saturated epoxy resin (2) a curing amount of a polyamide, and (3) from about 5% to about 50% by weight based on total weight of the epoxy resin and polyamide of a cellulose acetate butyrate, for from about 15 to 60 minutes in the presence of an organic solvent, before applying the composition to a suitable substrate.

DESCRIPTION OF THE PREFERRED EMBODIMENTS

In general, the present compositions provide excellent bond, tough coatings and are prepared by reacting (1) a saturated epoxy resin, preferably a diglycidyl polyether of a hydrogenated polyphenol, (2) a curing amount of a polyamide, and (3) from about 5% to about 50% by weight based on (1) and (2) of a cellulose acetate butyrate in the presence of an organic solvent. In other words, the instant compositions are simply prepared by pre-reacting the components for a period of from about 15 to 60 minutes at ambient temperature. This pre-reaction period is sometimes referred to as the "sweat-in" period or time. After the components have been pre-reacted for a sufficient "sweat-in" time, the resulting one-package composition is applied by well-known techniques to a suitable substrate and cured to produce a uniform, hard, tough surface coating or film.

Saturated Epoxy Resins

The epoxy compounds useful in the present compositions include those compounds derived from polyhydric phenols and having at least one vicinal epoxy group wherein the carbon-to-carbon bonds within the six-membered ring are saturated. Such epoxy resins may be obtained by two well-known techniques, i.e., (1) by the hydrogenation of glycidyl polyethers of polyhydric phenols, or (2) by the reaction of hydrogenated polyhydric phenols with epichlohydrin in the presence of a Lewis Acid catalyst and a subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium or ruthenium supported on an inert carrier at a temperature below about 50° C. This method is thoroughly disclosed in U.S. Pat. No. 3,336,241, and is suitable for use in preparing saturated epoxy resins. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by the dehydrohalogenation in the presence of caustic. When the phenol is hydrogenated bisphenol A, the resulting saturated epoxy compound is sometimes referred to as "diepoxidized hydrogenated bisphenol A", or more properly as the diglycidyl ether of 2,2-bis(4-cyclohexanol)propane.

In any event, the term "saturated epxoy resin", as used herein shall be deemed to mean the glycidyl ethers of polyhydric phenols wherein the aromatic ring structure of the phenols is or has been saturated.

An idealized structural formula representing the preferred saturated epoxy compounds is as follows:

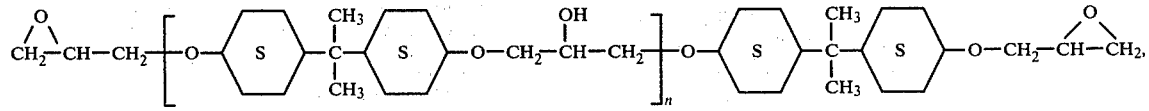

wherein n has a value so that the average molecular weight of the saturated polyepoxide is from about 350 to about 2500.

Polyamides

Polyamides which are useful in the present compositions are those derived from polymeric fatty acids and aliphatic polyamines. Polyamides of this type are disclosed in U.S. Pat. No. 2,450,940. Typically, these polyamides are those made from polymeric fatty acids containing up to about 22 carbon atoms in a monomeric acid with ethylene diamine and/or diethylene triamine. It will be appreciated that polyamide resins having terminal amine groups or terminal carobxyl groups or in which some of the terminal groups are amine groups while others are carboxyl groups.

The polymeric fatty acids employed in preparing the polyamides are those resulting from the polymerization of drying or semi-drying oils, or the free acids or simply aliphatic alcohol esters of such acids. Suitable drying or semi-drying oils include soybean, linseed, tung, perilla, oiticica, cottonseed, corn, tall, sunflower, safflower, dehydrated castor oil, and the like. In the polymerization process for the preparation of the polymeric fatty acids, the fatty acids with sufficient double bond functionality combine for the most part, probably by a Diels Alder mechanism, to provide a mixture of dibasic and higher polymeric acids. The acids with insufficient functionality to react remain as monomers and may be wholly or partially removed, for example by distillation. The residue after distillation consists of the desired polymeric acids and this mixture is used for the preparation of the polyamide resin. In place of this method of polymerization, any other method of polymerization may be employed whether the resultant polymer possesses residual unsaturation or not. The term "polymeric fatty acids" as used herein, is intended to include the polymerized mixture of acids obtained, which mixture usually contains a predominant portion of dimeric acids, a smaller quantity of trimeric and higher polymeric acids, and some residual monomer.

These polymeric fatty acids may be reacted with a variety of aliphatic polyamines for the production of the polyamide. The amidification reaction may be carried out under the usual conditions employed for this purpose, as will be evident from the examples. Polyamides of this type generally have molecular weights varying from 1,000 to 10,000 and are resistant to the corrosive action of water, alkali, acids, oils, greases, and organic solvents. The melting points vary, depending upon the reactants and the reaction conditions. Where aliphatic diamines, such as ethylene diamine, are employed for the preparation of the polyamide the resin may melt within the approximate range of 100°–120° C., and usually within the range of 100°–105° C.

Higher melting polyamide resins, for example melting within the range of 130°–215° C., may be made by employing a mixture of polymeric fatty acids and other polybasic acids, the latter having at least two carboxyl groups which are separated by at least 3 and not more than 8 carbon atoms. Typical of these polybasic acids are the aliphatic acids, glutaric, adipic, pimelic, suberic, azelaic, and sebacic, and the aromatic acids, terephthalic and isophthalic acids. The melting point of the copolymer resin may vary within the range previously indicated, depending upon the particular reactants, relative ratios thereof, as well as the reaction conditions.

Low melting polyamide resins melting within the approximate range of 25°–90° C. may be prepared from polymeric fatty acids and aliphatic polyamines having at least 3 atoms intervening between the amine groups principally involved in the amidification reaction. These three atoms may be carbon atoms or hetero atoms. Typical of the polyamines which may be used are diethylene triamine, triethylene tetramine, tetraethylene pentamine, 1,4-diaminobutane, 1,3-diaminobutane, hexamethylene diamine, 3-(N-isopropylamino)-propylamine, 3,3'-imino-bispropylamine, and the like. A preferred group of these low melting polyamides are derived from polymeric fatty acids, and diethylene triamine and are liquid at room temperature.

Suitable such polyamides are commercially available under the trade designation of VERSAMID ® Polyamide resins and are amber-colored polyamides having a molecular weight ranging from about 3000 to about 10,000 and a softening point from about below room temperature to 190° C. and prepared by condensing polymerized unsaturated fatty acids (e.g., dilinoleic acid) with aliphatic polyamines such as diethylene triamine.

The preparation of such VERSAMID ® polyamide resins is well-known and by varying the acid and/or the functionality of the polyamine, a great variety of viscosities, molecular weights and levels of active amino groups spaced along the resin molecule can be obtained. Typically, the VERSAMID ® polyamide resin have amine values from about 50 to 400; Gardner color (max.) of 8–10; and viscosities of from about 1 to 30 poises.

Organic Solvents

Suitable solvents include the aliphatic alcohols and glycols containing up to about 6 carbon atoms and at least one OH group. Examples of such solvents include methanol, ethanol, propanol, isopropanol, n-butanol, iso-butanol, hexanediol, ethylene glycol and propylene glycol.

Other suitable solvents include the so-called glycol ethers such as tht methyl, ethyl and butyl ethers of ethylene glycol or propylene glycol. Such glycol ethers are commercially available under the trade designation of OXITOL ® such as methyl OXITOL ® glycol ether, CELLOSOLVE ® and methyl CELLOXOLVE ®, and PROPASOL ® B.

Still other suitable solvents include the ketones such as acetone methyl ethyl keton (MEK), diethyl ketone, methyl iso-butyl ketone (MIBK), etc.

Cellulose Acetate Butyrate

The preparation of the cellulose acetate butyrate resins forms no part of the instant invention and are available commercially. Accordingly, the cellulose acetate butyrate resins (CAB resins) which are suitable for use in the present compositions possess the following typical properties:

| Butyryl content: | 37 to 55% by weight |
| Acetyl content: | 2 to 15% by weight |
| Hydroxyl content*: | 1.5 to 2% by weight |
| Viscosity Grade (ASTM D-1343-54T) | 0.01 to 0.5 seconds |
| Softening Point: | 125° to 200° C. |

*approximately one OH group for each four anhydroglucose units

The instant compositions are conveniently prepared by reacting the saturated epoxy resin with an approximately stoichiometric amount of the polyamide, although a slight excess of either reactant may be employed under certain circumstances. In general, about a 20% excess may be employed. To this composition is added from about 5% to about 50% by weight of epoxy resin and polyamide of the cellulose acetate butyrate, with from about 5% to about 15% by weight being preferred. Sufficient organic solvent is used to produce a system having up to 98% by weight of binder or vehicle (epoxy resin+polyamide+cellulose acetate butyrate). Expressed another way, at least 2% by weight of organic solvent is required. Preferably, the solution will contain from about 25% to about 95% by weight binder or vehicle.

The reaction is performed at ambient temperatures, i.e., from about 15° to 30° C., for a period from about 15 to 60 minutes. This reaction time or period will sometimes be referred to herein as the "sweat-in" time.

Before or during a suitable sweat-in period, conventional additives such as pigments, fillers, etc., may be added and resulting formulation applied by suitable means to a substrate and the coacting or film cured.

In general, if a pigmented system is desired, one or more pigments conventionally employed in surface coatings may be added to produce a pigment volume concentration of from about 15 to 25%.

The present coating compositions may be applied to a suitable substrate by any suitable means such as spraying, dipping, painting, doctor blade, or the like. The thickness of the film will depend on many circumstances, particularly the end-use of such baked coatings, e.g., as primers or as surface coatings.

The applied coating can be cured at ambient temperature or at higher temperatures. In general, the film will cure in 7 to 10 days at ambient (room) temperature, i.e., so-called "air-dry" cure. On the other hand, the film can be conveniently cured by baking at 80° to 120° C. for 10 to 30 minutes. A very acceptable cure cycle is 20 minutes at 93°–95° C.

The advantages of the instant compositions are illustrated by the following illustrative examples. The reactants, their proportions, and other specific ingredients are presented as typical and various modifications can be made in view of the foregoing disclosure and discussion without departing from the spirit or scope of the disclosure or of the claims. Unless otherwise specified, parts and percentages are by weight.

Polyether A is a diglycidyl polyether of hydrogenated 2,2-bis(4-hydroxyphenyl)propane having an average molecular weight of 426 and a weight per epoxy (WPE) of 234.

Polyamide A is VERSAMID® 1540 [a commercially available polyamide derived from the condensation of a dimer fatty acid and a polyamine having an amine value of 370–400, a Gardner color of 3 max and a viscosity at 40° C. of 25–40 poise, a viscosity at 25° C. or 120 poise and a specific gravity at 25° C. of 1.03 (8.58#/gal)].

The cellulose acetate butyrate (CAB) resins had the following properties:

| CAB | Hydroxyl, % w | Butyryl, % w | Acetyl, % w | Viscosity Grade |
|---|---|---|---|---|
| CAB-1 | 1.7 | 37.0 | 13.0 | 0.1 |
| CAB-2 | 1.6 | 53.0 | 2.0 | 0.2 |
| CAB-3 | 1.6 | 53.0 | 3.0 | 0.01 |
| CAB-4 | 50/50 mixture of CAB-2 + CAB-3 | | | |

CONTENT

EXAMPLE I

This example illustrates the properties of enamels prepared from the instant compositions.

In a 1-quart container were mixed the following:

| Component | Part by Weight |
|---|---|
| TiO$_2$ | 447.2 |
| Polyether A | 250.5 |
| Suspending/Thixotropic Agent | |
| (Bentone 27-NL Industries) | 5.0 |
| Methanol | 1.7 |
| Flow Control Agent (Urea-Formaldehyde Resin - BEETLE 216-8 -- American Cyanamid) | 12.5 |

The above mixture was dispersed in a Cowles dissolver at 4,000 rpm for 10 minutes. This blended composition is hereinafter referred to a "Mill Base A".

To 716.9 parts by weight of "Mill Base A" were added several CAB resin solutions (and one control) having the following compositions:

| Components | Control | CAB RESIN SOLUTION, PARTS BY WEIGHT | | | |
|---|---|---|---|---|---|
| | | A | B | C | D |
| CAB-1 | — | 62.6 | — | — | — |
| CAB-2 | — | — | 62.6 | — | — |
| CAB-3 | — | — | — | 62.6 | — |
| CAB-4 | — | — | — | — | 62.6 |
| Polyether A | 40.4 | — | — | — | — |
| MEK | 13.9 | 13.9 | 13.9 | 13.9 | 13.9 |
| BUTYL OXITOL® glycol ether | 15.6 | 15.6 | 15.6 | 15.6 | 15.6 |
| n-Butyl Alcohol | 44.5 | 44.5 | 44.5 | 44.5 | 44.5 |
| Toluene | 70.6 | 70.6 | 70.6 | 70.6 | 70.6 |
| | 185.0 | 207.3 | 207.3 | 207.3 | 207.3 |

To each of the above mixtures were added the following:

| Component | CAB Resin Solution Mill Base A, Pbw | Control + Mill Base A, Pbw |
|---|---|---|
| VERSAMID 1540 | 137.7 | 159.9 |
| MEK | 9.2 | 9.2 |
| Butyl OXITOL glycol ether | 10.4 | 10.4 |
| n-butanol | 30.6 | 30.6 |
| Toluene | 46.7 | 46.7 |
| | 234.6 | 256.8 |

The enamel had the following properties:

Pigment to Binder ratio of 1:1
Total Solids        78.6% w
Total Solids        64.5% v
Pigment Volume (PV) Concentration 21.3% v The epoxy enamels modified with the CAB resins are hereinafter designated as Enamel A, B, C, D and Control, corresponding to the enamels containing CAB-1, etc.

The above enamels were allowed to set for 1 hour and then applied to cold roll steel panels and dried at room temperature.

The drying times for the respective enamels were as follows:

| Enamel | Set to touch, | Cotton-free, hours |
|---|---|---|
| A | 0:10 | 3:40 |
| B | 0:35 | 3:20 |
| C | 3:00 | >5:00 |
| D | 0:20 | >5:00 |
| Control | >5:00 | >5:00 |

EXAMPLE II

The procedure of Example I were repeated wherein the amounts of CAB resins were varied while maintaining the Pigment to Binder Ratio and solids content the same as Example I. Accordingly, Mill Base A composition was adjusted by reducing the amount of Polyether A and flow control agent with a corresponding increase in the CAB resin to form other Mill Base compositions as follows:

| | Mill Base Compositions | | |
|---|---|---|---|
| Components | B | C | D |
| TiO$_2$ | 447.2 | 447.2 | 447.2 |
| Polyether A | 262.7 | 271.8 | 281.1 |
| Bentone 27 | 5.0 | 5.0 | 5.0 |
| Methanol | 1.7 | 1.7 | 1.7 |
| Beetle 216-8 | 13.1 | 13.6 | 14.1 |

To the above Mill Base compositions were added the following CAB Resin Solutions as hereinafter described:

| | CAB Resin Solution, Parts by Weight | | | |
|---|---|---|---|---|
| Components | E | F | G | H |
| CAB-2 | 62.6 | 43.5 | 29.0 | 14.5 |
| MEK | 26.9 | 26.9 | 26.9 | 26.9 |
| Butyl OXITOL glycol ether | 13.9 | 13.9 | 13.9 | 13.9 |
| IPA | 15.3 | 15.3 | 15.3 | 15.3 |
| Toluene | 88.5 | 88.5 | 88.5 | 88.5 |

Various curing agent mixtures for blending with the previously prepared Mill Base/CAB Resin Solution blends were prepared as follows:

| | Curing Agent, Parts by Weight | | | |
|---|---|---|---|---|
| Component | A | B | C | D |
| VERSAMID 1540 | 137.7 | 144.4 | 149.5 | 154.5 |
| MEK | 18.0 | 18.0 | 18.0 | 18.0 |
| Butyl OXITOL glycol ether | 9.2 | 9.2 | 9.2 | 9.2 |
| IPA | 10.3 | 10.3 | 10.3 | 10.3 |
| Toluene | 59.3 | 59.3 | 59.3 | 59.3 |

Enamels were then prepared from the above compositions as follows:

| Composition Mill Base | CAB Resin Solution | Curing Agent | Enamel |
|---|---|---|---|
| A | E | A | E |
| B | F | B | F |
| C | G | C | G |
| D | H | D | H |

Films were prepared from the above enamels (after an induction period of 1 hour) as in Example I. Drying times of the enamels are as follows:

| Enamel | Set to Touch, hours |
|---|---|
| E | 0:30 |
| F | — |
| G | 2:00 |
| H | 4:54 |
| Control | >6:00 |

What is claimed is:

1. A room-temperature curable epoxy coating composition prepared by reacting (1) a saturated epoxy resin, (2) a curing amount of a polyamide, and (3) from about 5% to about 50% by weight, based on the total weight of epoxy resin and polyamide, of a cellulose acetate butyrate for from about 15 to about 60 minutes in the presence of an organic solvent, before applying the composition to a suitable substrate.

2. The composition of claim 1 wherein the saturated epoxy resin is a glycidyl ether of a hydrogenated polyphenol.

3. The composition of claim 2 wherein the hydrogenated polyphenol is hydrogenated 2,2-bis(4-hydroxyphenyl)propane.

4. The composition of claim 1 wherein the organic solvent is a glycol ether.

5. The composition of claim 1 wherein the organic solvent is an alcohol.

6. The composition of claim 1 wherein the organic solvent is a ketone.

7. The composition of claim 1 wherein the organic solvent is an aromatic compound.

8. The composition of claim 1 wherein the polyamide is a normally liquid polyamide derived from a polymeric fatty acid and ethylene diamine or diethylene triamine.

9. The composition of claim 1 wherein the cellulose acetate butyrate has a hydroxyl content of about 1.6%, a butyryl content of from about 37% to about 53%, and an acetyl content of from about 2% to about 13% on a weight basis.

* * * * *